(12) United States Patent
Plouzen

(10) Patent No.: US 11,076,580 B2
(45) Date of Patent: Aug. 3, 2021

(54) VARIABLE DIMENSION POULTRY FEEDER

(71) Applicant: Philippe Plouzen, Sibiril (FR)

(72) Inventor: Philippe Plouzen, Sibiril (FR)

(73) Assignee: BUTTERFLY CONCEPTS LLC, Middlebury, IN (US)

(*) Notice: Subject to any disclaimer, the term of this patent is extended or adjusted under 35 U.S.C. 154(b) by 364 days.

(21) Appl. No.: 16/124,683

(22) Filed: Sep. 7, 2018

(65) Prior Publication Data

US 2020/0077628 A1 Mar. 12, 2020

(51) Int. Cl.
A01K 39/00 (2006.01)
A01K 39/01 (2006.01)
A01K 39/012 (2006.01)
A01K 39/014 (2006.01)

(52) U.S. Cl.
CPC .......... A01K 39/0125 (2013.01); A01K 39/00 (2013.01); A01K 39/01 (2013.01); A01K 39/012 (2013.01); A01K 39/014 (2013.01)

(58) Field of Classification Search
CPC .... A01K 39/014; A01K 39/0125; A01K 5/01; A01K 1/0356; A01K 39/012; A01K 39/01; A01K 5/02
See application file for complete search history.

(56) References Cited

U.S. PATENT DOCUMENTS

| | | | |
|---|---|---|---|
| 700,522 A | 5/1902 | Maginnis | |
| 1,200,275 A | 10/1916 | Tremper | |
| 1,629,979 A | 5/1927 | Steinback | |
| 1,771,647 A | 7/1930 | Moe | |
| 1,832,999 A | 11/1931 | Rummell | |
| 1,868,957 A | 7/1932 | Tolley | |
| 2,163,186 A | 6/1939 | Bergeron | |
| 2,361,598 A | 10/1944 | Calhoon | |
| 2,514,491 A | 7/1950 | Hay et al. | |
| 2,735,402 A * | 2/1956 | Lorenzo | A01K 39/014 119/61.31 |
| 4,375,791 A | 3/1983 | Peppler | |
| 4,947,798 A | 8/1990 | De Wispelaere | |
| 5,462,017 A | 10/1995 | Pollock et al. | |
| 5,778,821 A | 7/1998 | Horwood et al. | |
| 6,467,429 B1 * | 10/2002 | Plouzen | A01K 39/0125 119/61.31 |
| 9,723,811 B2 | 8/2017 | Dalrymple | |

* cited by examiner

Primary Examiner — Christopher D Hutchens
Assistant Examiner — Steven J Shur
(74) Attorney, Agent, or Firm — Flynn Thiel, P.C.

(57) ABSTRACT

A feed hopper with two chute members is provided. The chutes are movable with respect to one another and one chute has an extending lip to engage the inner surface of the other chute to prevent feed from escaping the hopper.

18 Claims, 7 Drawing Sheets

VARIABLE DIMENSION POULTRY FEEDER

BACKGROUND AND SUMMARY OF THE INVENTION

The present invention concerns a feeder for poultry, used mainly in a poultry feeding facility. In particular, the present invention relates to apparatus for feeding poultry or like animals in large scale houses over the entire life cycle of the animals.

Such a facility typically includes a feed-distribution system connected to screw conveyors mounted in very long tubes. Regularly spaced along each conveyor are several feeders, pans or receptacles connected to the conveyors so as to receive feed therefrom. The feed transported by each tube is routed to the feeders as they are being emptied, so as to refill them.

One embodiment of the present invention is a feeder which is adapted for use by animals of young age as well as adult animals. An advantage of embodiments of the invention is a variable feed capacity of a feeder, which can be varied according to the age of the animals to which it is applied.

Another advantage of embodiments of the present invention is a feeder which can accommodate fine-grain feed without unwanted spillage/seepage and waste.

To this effect, an embodiment of a feeder according to the present invention includes a receptacle consisting of two chutes or sections of which one is able to be lodged inside the other, said chutes being able to assume between them all relative positions between a position where the first chute is inside the other chute, so that the receptacle presents its smallest capacity for feed presentation, and another position where said chutes only overlap in an area of small size, so that the receptacle presents its highest capacity for feed presentation. The first chute may have a lip which scrapes against the bottom of a second chute. The second chute may include extending leads to ensure the lip of the first chute does not catch the inner edge of the second chute.

According to a preferred characteristic of the present invention, the two chutes, to be able to assume their relative positions, are able to pivot freely one about the other and independently of each other. Appropriately, each chute is shaped as a portion of a cylinder.

According to another preferred characteristic of the present invention, the feeder includes a feed hopper in the general shape of an inverted V, with an opening at its top through which the feed from a distribution system is emptied and with an opening in its lower part, that empties into the receptacle.

According to another preferred characteristic of the present invention, inside the hopper there is a feed flow directing wall in the general shape of an inverted V.

According to another preferred characteristic of the present invention, the feeder includes a manual control system for pivoting or moving the chutes between a variety of desired positions of different feed retaining capacity or no feed retaining capacity.

According to one variation, the feeder includes a control system, for pivoting the chutes, that is equipped with a cable, a connection system attached to the cable on one end, and, on the other end, attached to the outer edges of each of the chutes, by means of shafts, rods or additional cables.

According to another preferred characteristic of the present invention, the connection system consists of a first lever that can pivot about a pin and two secondary levers connected to the pin, the free ends of the secondary levers being connected to the edges of the chutes.

According to another preferred characteristic of the present invention, the inner edge of the inner chute includes a lip closely adjacent or in contact with the outer chute. Preferably, the inner edge of the outer chute has one or more leads to assist in preventing the lip from catching the inner edge of the outer chute.

According to another preferred characteristic of the present invention, it is possible to pivot the two chutes to their maximum position, in such a way that they no longer overlap, thus opening the lower part of the receptacle.

The characteristics of the invention mentioned above, as well as others, will appear more clearly in reading the following description of preferred embodiments of the present invention, said description relating to the attached drawings.

DESCRIPTION OF PREFERRED EMBODIMENTS

Figure 1:
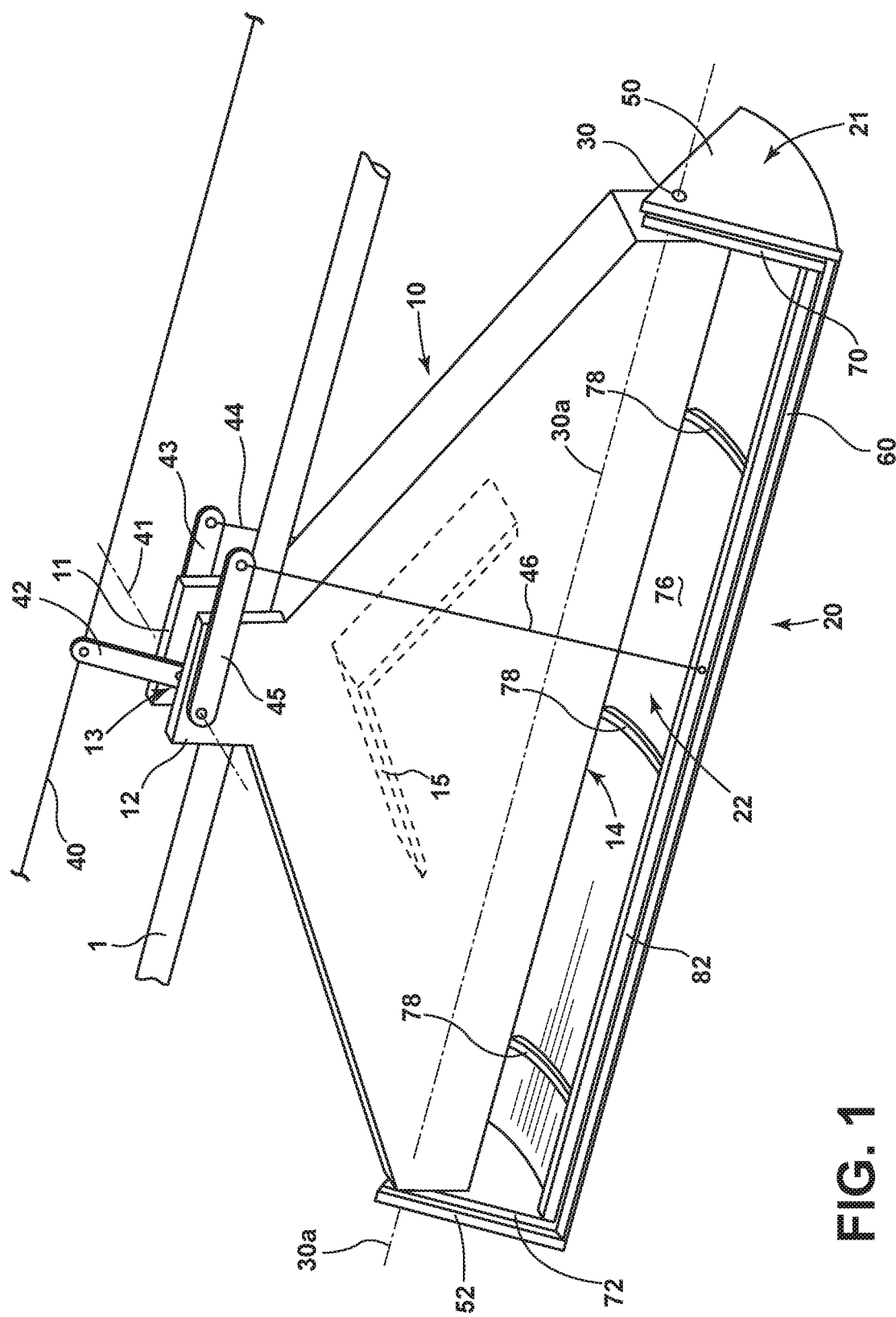
FIG. 1 is a perspective view of a feeder according to the present invention, the feeder being in a position of low capacity.

The feeder in FIG. 1, in a simplified form, includes a feeder pan of feed hopper 10 in the general shape of an inverted V. This hopper 10 serves as a reservoir for feed. The top of the hopper 10 is, for example, formed from two plates 11 and 12 that serve to fix with respect to it to a feed distribution system, consisting, for example, of a substantially horizontal tube 1 in which there is a conventional feed screw conveyor. In a large scale poultry feeding system, a plurality of such hoppers 10 are disposed along a length of tube 1. The hopper 10 is made with an opening 13 through which the feed from the distribution system conveyor is allowed to flow into hopper 10 in a conventional manner. The lower part of the hopper 10 is made with an opening 14 which extends, for example, its entire length and entire width. The hopper 10 is configured and arranged to empty the feed from the distribution system conveyor into a receptacle 20 formed at the lower portion of the hopper 10.

Figure 2:
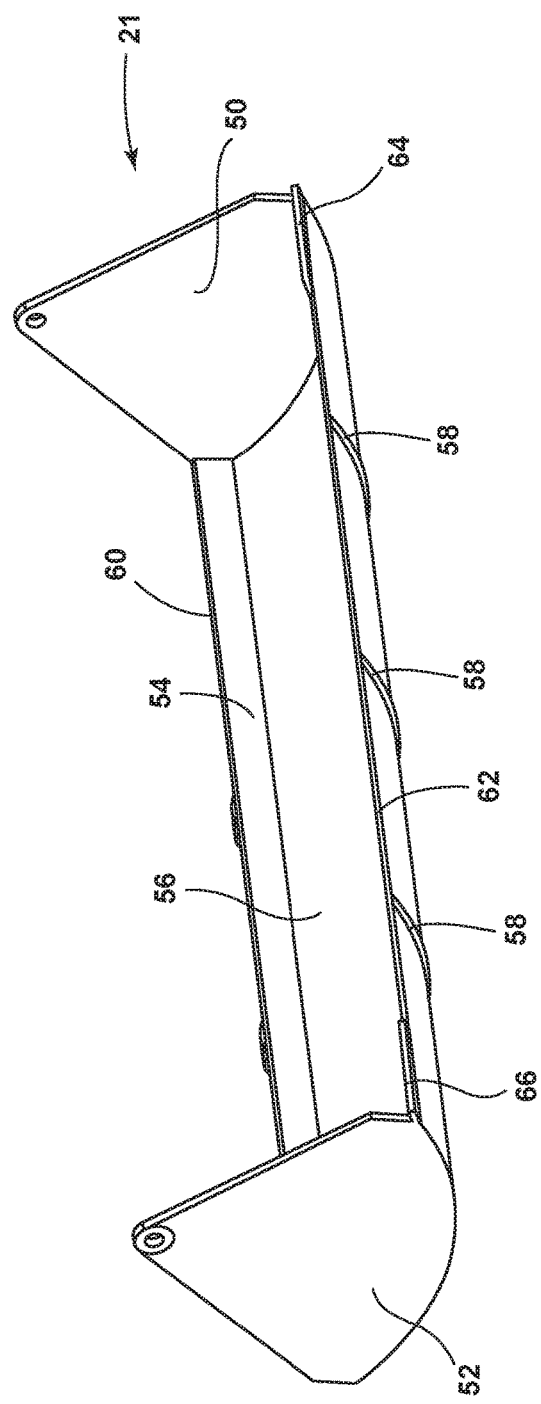
FIG. 2 is a front perspective view of an outer tray chute of the feeder of FIG. 1, the outer tray chute including leads.
Figure 3:
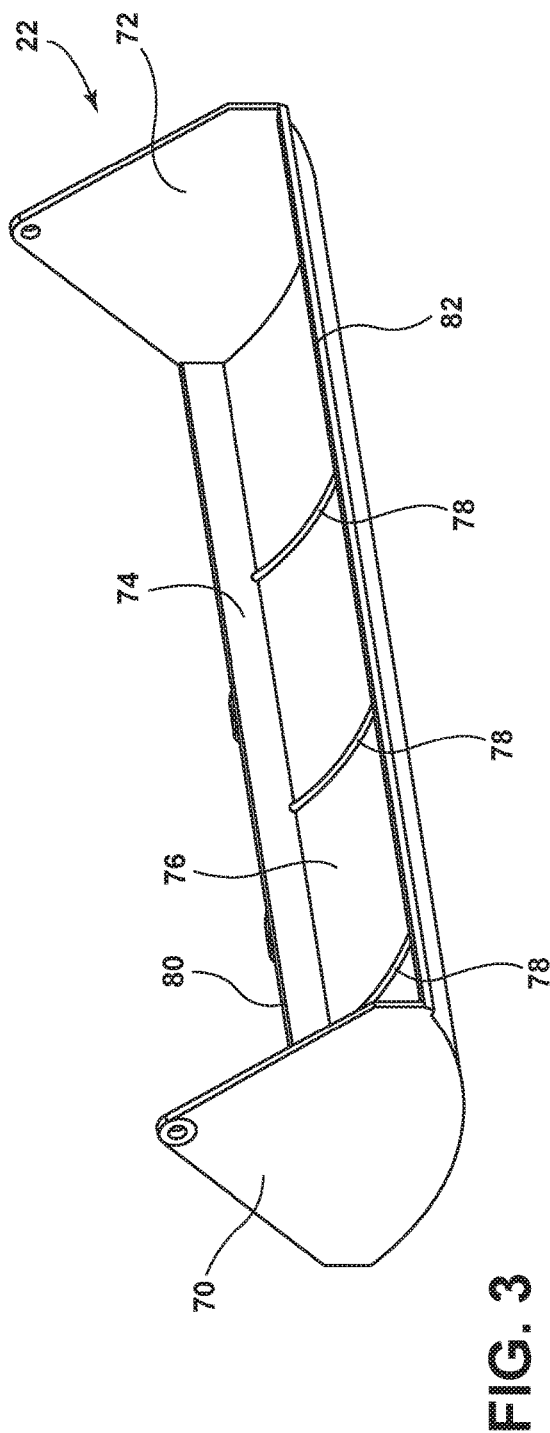
FIG. 3 is a rear perspective view of an inner tray chute of the feeder of FIG. 1, the inner tray chute including a lip.

In the preferred embodiment illustrated, the receptacle 20 has two relatively movable walls or chutes 21 and 22. The chute 21 can, for example, be formed from two lateral walls 50 and 52 (see FIG. 2), each of those walls presenting an arc of circular section, and a back wall 54 supported by and joining the lateral walls 50 and 52. The chute 21 also includes a base 56 extending between the walls 50 and 52, which is preferably curved, so that the chute 21 presents the shape of a portion of a cylinder or the shape of a curved cradle or the shape of a trough.

The base 56 preferably has a plurality of reinforcement ribs 58 on its underside. On one side of the chute 21, the back wall 54 terminates in an upper edge 60. On the opposing side of the chute 21, the base 56, along a majority of the length of the chute 21, terminates in an inner edge 62. Adjacent one end of the chute 21, extending from the inner edge 62, is a first lead 64. Adjacent the opposite end of the chute 21 extending from the inner edge 62, is a second lead 66. The leads 64, 66 extend at an angle slightly downwardly with respect to the edge 62. Also, the leads 64, 66 are preferably thinner than the base 56 (see FIG. 5).

Similarly, the chute 22 preferably has two lateral walls 70 and 72 and a back wall 74 connected to and bearing on the lower edges of the lateral walls 70 and 72 so that it also presents the shape of a portion of a cylinder or the shape of a curved cradle. The chute 22 also includes a base 76 extending between the walls 70, 72.

The base 76 preferably has a plurality of reinforcement ribs 78 on its upper side. On one side of the chute 22, the back wall 74 terminates in an upper edge 80. On the opposing side of the chute 22, the base 76 has a lip 82 extending outwardly therefrom. The lip 82 preferably extends lengthwise the entire length of the base 76, and extends downwardly with respect to the base 76, as shown in FIGS. 4-7.

In the illustrated example, the chute 22 is of such dimensions that it can be placed closely inside the chute 21 (see FIG. 1), the underside of the base 76 of the chute 22 adjacent to the upper side of the base 56 of the chute 21, preferably so as to seal against the flow of feed therebetween due to the lip 82 engaging the base 56, as shown in FIGS. 4-7.

Figure 4:
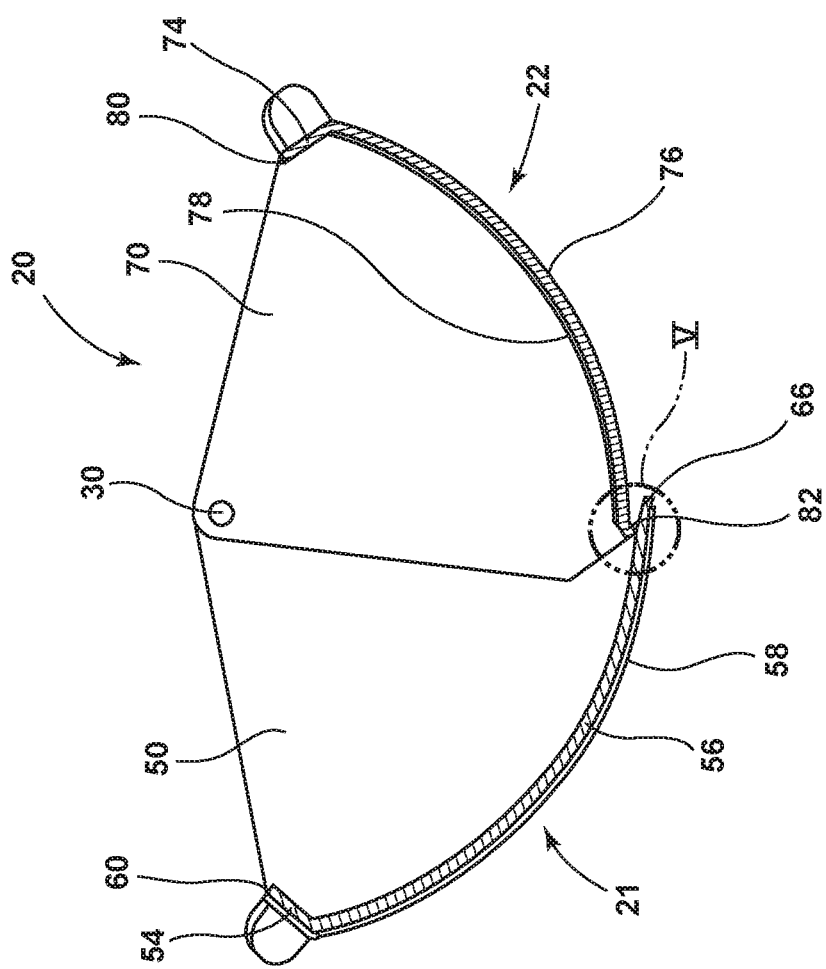
FIG. 4 is a cross-sectional end view of the tray chutes of FIGS. 2 and 3 when connected, the respective position of the chutes being such that the feed capacity is high.
Figure 5:
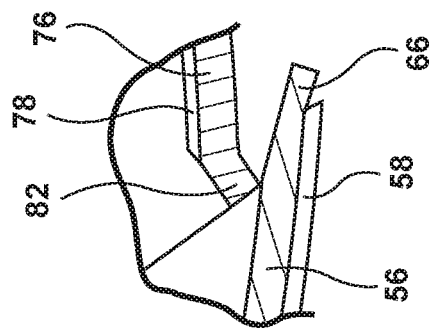
FIG. 5 is an expanded view of portion V of FIG. 4.

As shown in FIGS. 4-5, the lip 82 may engage one or both of the leads 64, 66 as the chutes 21, 22 are rotated toward one another. The leads 64, 66 ensure that the lip 82 does not get caught on the inner edge of the chute 21, and cause the lip 82 to slide easily onto the upper side of the base 56. The engagement of the lip 82 and the upper side of the base 56 prevents even the finest feed from escaping the feed hopper 10.

Figure 7:
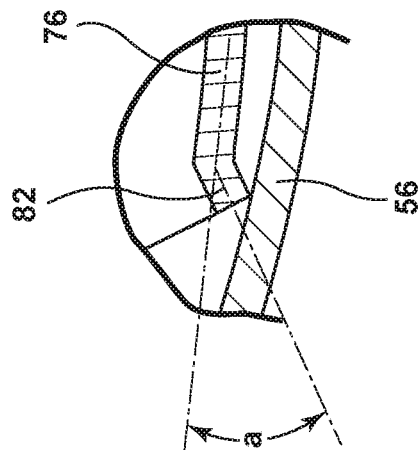
FIG. 7 is an expanded view of portion VII of FIG. 6.
Figure 6:
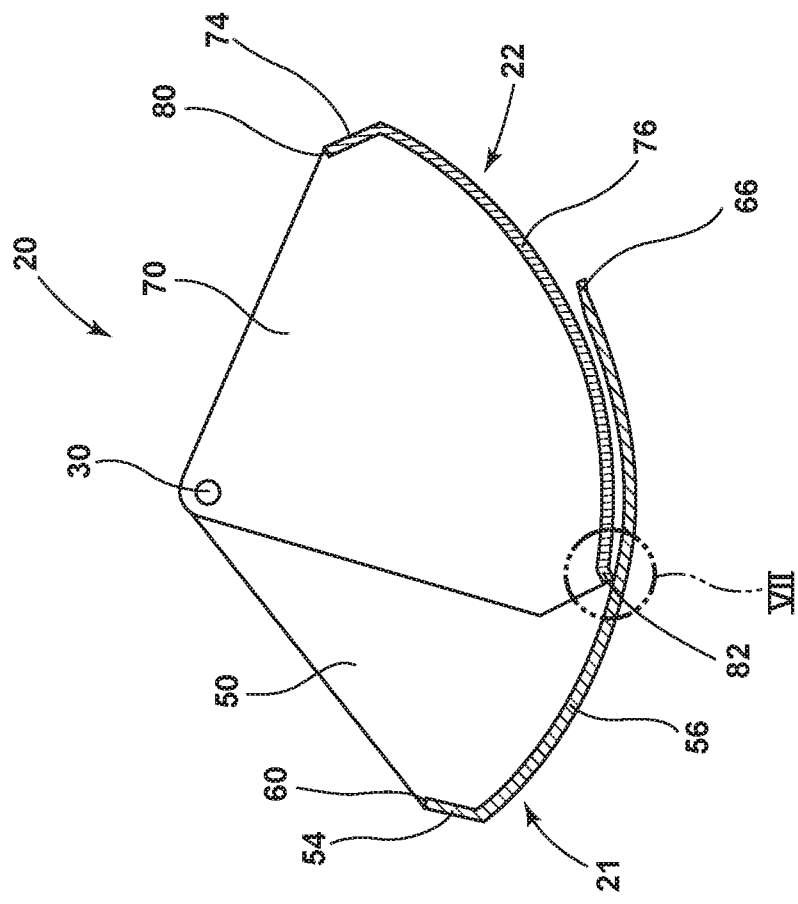
FIG. 6 is a cross-sectional end view of the tray chutes of FIGS. 2 and 3 when connected, the respective position of the chutes being that the feed capacity is lower than that of FIG. 4.

As the chutes 21, 22 are rotated toward or away from each other, the lip 82 stays in engagement with the upper side of the base 56. The chutes 21, 22 are shown in FIGS. 6-7 in another respective position. As seen in these drawings, the lip 82 is in contact with the base 56 in this position as well, and preferably remains in contact throughout the entirety of movement of the chutes 21, 22 relative to each other. The lip 82 preferably extends downwardly with respect to the base 76 at an angle "a." Angle a is preferably between about 25° and about 35°, and most preferably is about 30°.

On their upper parts, lateral walls 50 and 52 of the chute 21 as well as lateral walls 70 and 72 of the chute 22 include a hole made to receive horizontal pins 30 connected to the hopper 10. In the illustrated example, each pin 30 is aligned along a longitudinal axis 30a and the chutes 21 and 22 are mounted so as to pivot freely and independently of each other about these pins 30 on that axis so as to assume a position as shown in FIG. 1, for example, with the chute 22 disposed inside the chute 21. Stated another way, the chutes 21 and 22 are pivotably connected so as to form a butterfly joint between them. When the chutes 21, 22 are moved with respect to one another, the lip 82 scrapes the upper side of the base 56.

In preferred embodiments, the distance between the opening 14 and the chute 22 is established to be smaller than an area within which the poultry or animals being fed can enter. Thus, when the chutes 21 and 22 fully overlap, the poultry can get their head in to peck at the feed on the chutes, but not actually stand on the chutes to enter receptacle 20 and thereby contaminate the feed.

One will note that in the position of FIG. 1, the feed retaining capacity of receptacle 20 is at its lowest while in the position of FIGS. 4-5, it is at its highest. FIGS. 6-7 show an intermediate position.

The reference numeral 120 (FIG. 8) generally designates another embodiment of the present invention, being a second embodiment for the variable dimension poultry feeder. Since the receptacle 120 is similar to the previously described receptacle 20, similar parts appearing in FIGS. 1-7 and FIG. 8, respectively, are represented by the same, corresponding reference number except for adding 100 to the part numbers of the former for the embodiment depicted in FIG. 8.

Figure 8:
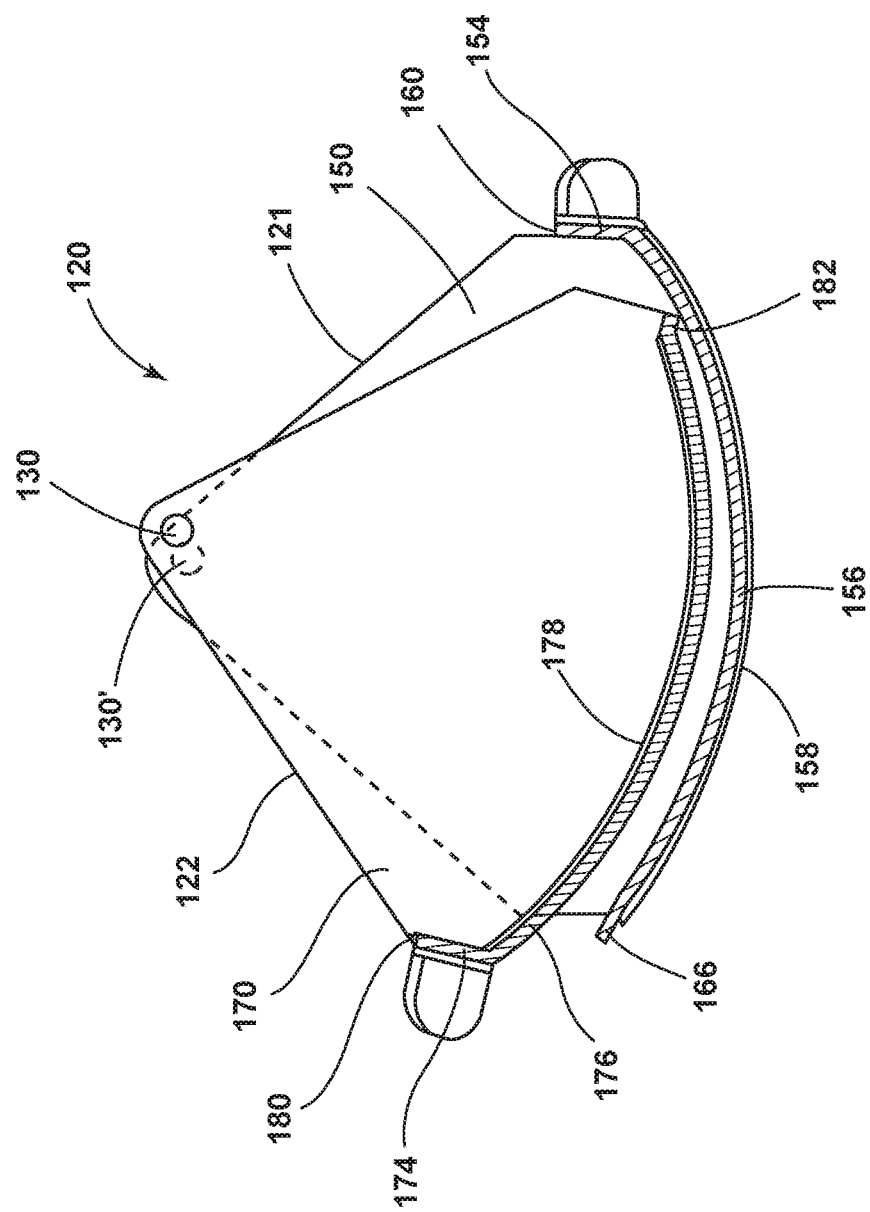
FIG. 8 is a cross-sectional end view of the tray chutes of a second embodiment, when the tray chutes are connected.

The receptacle 120, shown in FIG. 8, is similar to the first embodiment of FIGS. 1-7 in that there is an outer chute 121 and an inner chute 122. The outer chute 121 includes a base 156 with a plurality of reinforcement ribs 158 on its underside. The chute 121 also has a first lateral wall 150 and a second lateral wall (not shown) with each of the walls presenting an arc of circular section, and a back wall 154 supported by and joining the lateral walls. The back wall 154 terminates in an upper edge 160. Extending from the base 156, and adjacent one end of the chute 121, is a lead 166. Additional leads may be employed such as at the opposite end of the chute 121, as discussed above.

The inner chute 122 includes a first lateral wall 170 and a second lateral wall (not shown), in addition to a back wall 174 that extends between the lateral walls and terminates in an upper edge 180. A base 176 extends between the lateral walls and preferably has a plurality of reinforcement ribs 178 on its upper side. The base 176 includes a lip 182 extending outwardly therefrom. The lip 182 preferably extends the entire length of the base 176 and extends downwardly with respect to the base 176.

The chute 122 is connected to a rod or other member creating a pivot point at the reference numeral 130 as depicted in FIG. 8. The chute 121 is connected to a rod or other member at a pivot point that is depicted by reference numeral 130' in FIG. 8. In this embodiment, the pivot points 130 and 130' are in different locations; that is, chutes 121 and 122 pivot around different axes. If positioned correctly, this creates a structure whereby the lip 182 makes more contact and scrapes more fully against the upper surface of the base 156 as the chute 122 rotates inwardly (that is, as the lip 182 travels toward the back wall 154.

Figure 9:
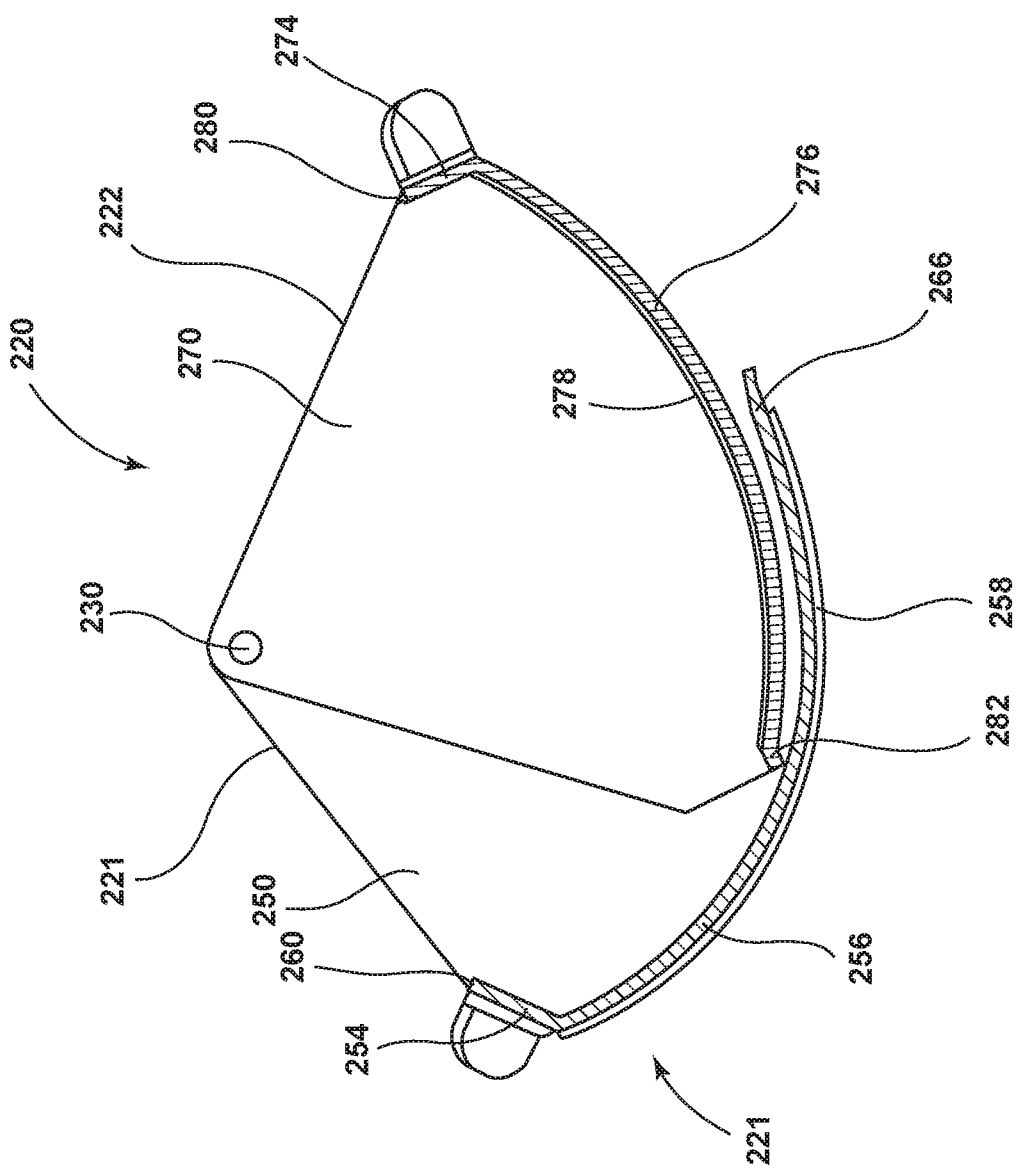
FIG. 9 is a cross-sectional end view of the tray chutes of a third embodiment, when the tray chutes are connected.

The reference numeral 220 (FIG. 9) generally designates yet another embodiment of the present invention, being a third embodiment of the variable dimension poultry feeder. Since the receptacle 220 is similar to the previously described receptacle 20, similar parts appearing in FIGS. 1-7 and FIG. 9, respectively, are represented by the same, corresponding number except that 200 is added to the numerals of the latter.

In this embodiment, the receptacle 220 has two chutes 221 and 222. The chute 221 is the outer chute and includes a first lateral wall 250 and a second lateral wall (not shown), each of the walls representing an arc of circular section. The chute 221 also has a back wall 254 supported by and joining the lateral walls. The chute 221 includes a base 256 extending between the lateral walls, and which is preferably curved. The base 256 preferably has a plurality of reinforcement rims 258 on its underside. The back wall 254 preferably terminates in an upper edge 260. The base 256 terminates at its inner edge in one or more leads 266. The leads are preferably placed adjacent opposite ends of the chute 221 (that is, each near a lateral wall) but may be placed anywhere that is useful or may extend the entire length of the base 256.

The inner chute 222 includes a base 276 that terminates in a lip 282 that preferably extends the entire length of the base 276. Preferably, a plurality of reinforcement ribs 278 are attached to the upper side of the base 276. A back wall 274 is attached and supported by the base 276 and terminates in an upper edge 280. Both of the chutes 221 and 222 are connected at and rotate about a rod or other member at a pivot axis 230.

In this embodiment, the curvature of the base 256 is slightly tighter than that of the base 276. In other words, the radius associated with the arc created by the base 256 is slightly smaller than the radius associated with the arc created by the base 276. Due to this difference in curvatures, the lip 282 in this embodiment will continually engage in a tighter fashion and thus ensure more of a seal between the lip 282 and the upper surface of the base 256 as the chute 222 rotates inwardly with respect to the chute 222 (i.e., as the lip 282 moves toward the back wall 254).

Controlling the relative position or opening and closing of the chutes 21 and 22 can be done manually, for example, by a hand wheel mounted at the level of pin 30. In FIG. 1 a remote control system is shown. In a simplified version, this control system consists of a cable 40 that runs parallel to the tube 1 of the distribution system and can connect to each of the hoppers 10 used along the tube 1 so as to provide simultaneous control. A lever 42 is mounted between the two plates 11 and 12 of the hopper 10. The lever 42 pivots about a laterally extending rod or pin 41 perpendicular to the plates 11 and 12. The free end of the lever 42 is attached to the cable 40. A lever 43 is mounted integral with the pin 41, outside the plate 11 in the illustrated example. The free end of the lever 43 is connected to the outside edge of the chute 21 by means of a cable, rod or shaft 44. Similarly, another lever 45 is mounted integral with the pin 41, outside the plate 12. The free end of the lever 45 is connected to the outside edge of the chute 22 by means of a cable, rod or shaft 46.

One will note that the levers 42, 43, and 44 constitute a connection system for the movement of the cable 40 over the edges of each chute 21 and 22, by means of the shafts 44 and 46.

In those embodiments where the cable 40 is commonly used by a plurality of feeders, pulling on the cable to the left or to the right will result in all feeders being adjusted simultaneously and remotely from the feeder location.

Inside the hopper 10 is a bridge wall 15, in the general shape of an inverted V which serves to separate the flow of feed coming from the entrance 13 and to retain a portion of the feed within the hopper 10 as a reservoir. Thus, the feed in the reservoir can be kept more fresh and uncontaminated than the feed exposed in the receptacle 20 until such time and the volume of feed in the receptacle 20 is lowered by consumption. The feed in the hopper 10 then automatically falls into the receptacle 20.

Preferably, each of the chutes 21, 22 presents the shape of a portion of a cylinder with flat end-walls. However, a person skilled in the field will understand that the end-walls could just as easily be hemispheric and likewise that each chute 21 and 22 could present the shape of a hemisphere, inasmuch as the first chute 21 could be inside the second chute 22 in one position, and that, in another position, they could only overlap in a small-sized area.

One will also note that in rotating the two chutes to the maximum extent, back walls 54 and 74 will not overlap, but opening the lower part of the receptacle 20 and retaining no feed therein. In fact, it is envisioned that the chutes can be rotated so far as to abut the plates 11 and 12, thereby permitting full exposure to the opening 14 and the interior of the hopper 10 from below hopper 10. Such opening of the receptacle 20 can provide important advantages, especially for emptying and cleaning of the receptacle 20 and/or the hopper 10 between flocks of poultry being raised.

Figure 10:
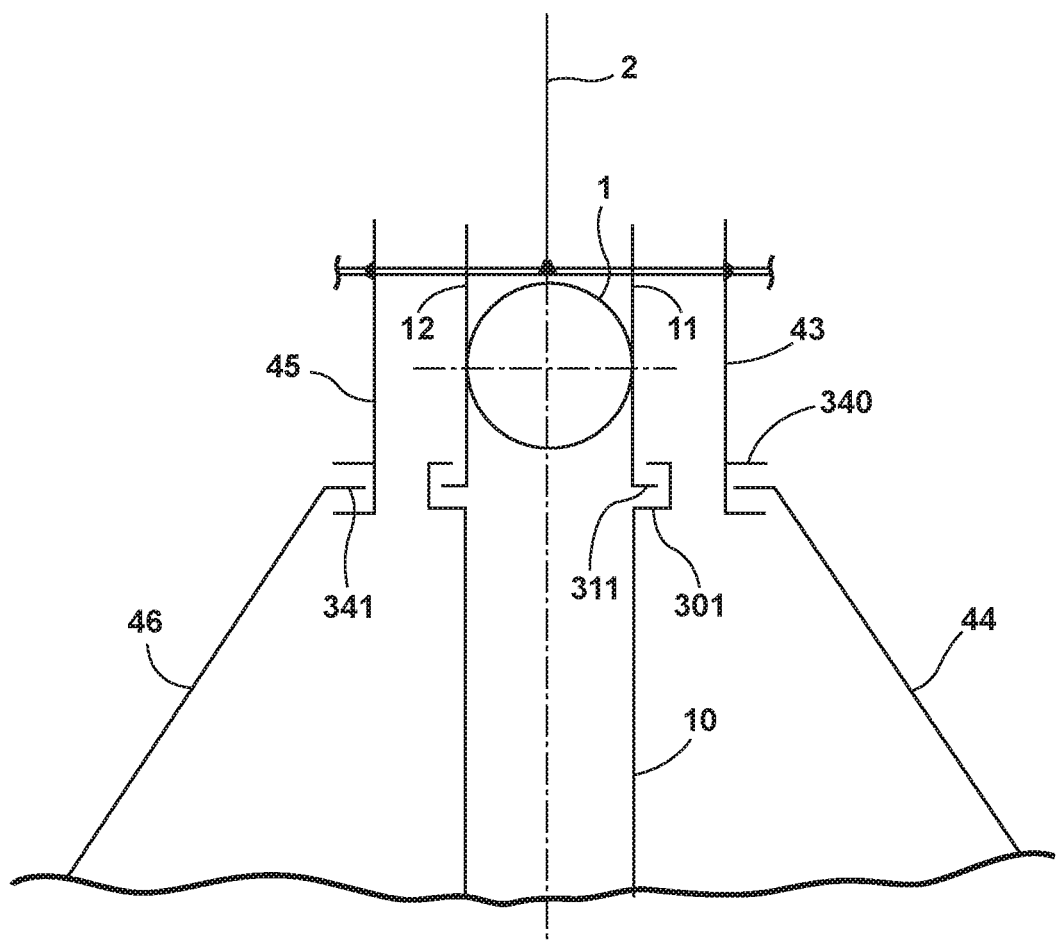
FIG. 10 is a partial, schematic view of a cross section of the feeder, taken laterally with respect to FIG. 1.

FIG. 10 shows the assembly of a feeder according to one preferred variation of the invention, on the tube 1 of a distribution system. According to this variation, the hopper 10 is mounted on the tube 1 so that the feeder assembly can rotate about a vertical axis 2. To do this, the top of the hopper 10 includes an annular groove 301 in which a disc 311 is located where the two plates 11 and 12 bracketing the tube 1 are attached. On the other hand, arms 43 and 45 have their lower ends made with an annular groove 340, and shafts 44 and 46 have their upper ends attached to a ring 341 located in the annular groove 140. This variation permits the feeder to be oriented, for example, so that the receptacle 20 is turned 90 degrees with respect to the view of FIG. 1, axis 30a being then orthogonal to the longitudinal axis of the tube 1, as where a greater number of feeders are desired to be employed along the tube 1, more closely spaced.

Thus, it will be seen that the present invention provides a receptacle for retaining feed that is expandable in volume to control the amount of feed retained therein. This invention allows both the surface area of feed and the depth of the feeder to be regulated as desired according to the age and nature of the poultry being fed. Moreover, the receptacle retains even the finest of feed. It will be understood that the present invention can be similarly used in the feeding of other animals besides poultry.

Various alternative embodiments are contemplated by the present invention, including the provision of a third wall member mounted between the chutes 21 and 22 for expanded capacity. In that variant, the third wall could be relatively fixed, with two sets of pins 30 mounted on each end thereof to permit the chutes 21 and 22 to move relative to the third wall. In that case the axis of movement of the chute 21 about its pins 30 would preferably be parallel to the axis of movement of the chute 22 about its pins 30. In this embodiment, the chute 22 may have two lips, depending on the structure of the third wall. In another embodiment of the present invention the chutes 21 and 22 use separate pins 30 at each end, rather than share a common pin 30 at each end as shown in the Figures. If such separate pins 30 are used, the axis between each set of pins for each chute is preferably parallel. Another embodiment could include only a single movable chute, pivotable relative to a single, fixed wall.

Further, alternative control systems can be employed to move the chutes 21 and 22 simultaneously or individually, as desired in particular applications. Although it is often desirable to have each receptacle 20 in the feeder systems configured to retain the same volume of feed, in particular situations, receptacles 20 can be individually controlled to have differing volumes of feed.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A poultry feeder comprising:
a first tray member having a first base; and
a second tray member having a second base with an inner end portion and a lip connected to the inner end portion, the lip extending downwardly from the inner end portion at an angle of between about 25° and about 35°,
the first tray member and the second tray member adjacent one another and movable with respect to one another thereby together defining a size-adjustable tray,
the lip of the second tray member engaging the first base of the first tray member to assist in preventing feed from escaping the tray.

2. The poultry feeder of claim 1, wherein the lip is disposed in a substantially flat plane and has an end edge in the plane.

3. A poultry feeder comprising: a tray comprising a first wall and a second wall together defining a feed retaining region, the first wall and the second wall movable with respect to each other, the second wall including a lip that engages the first wall both when the first wall and the second wall are stationary with respect to each other and when one of the first wall and the second wall is moved with respect to the other, thereby keeping feed retained in the tray; wherein the second wall has an inner end portion from which the lip extends, wherein the lip extends downwardly between about 25° and about 35° with respect to the inner end portion.

4. The poultry feeder of claim 3, and further including a lead member depending from the first wall and defining an inner edge of the first wall.

5. The poultry feeder of claim 3, wherein the first wall has a curvature.

6. The poultry feeder of claim 5, wherein the second wall has a curvature.

7. The poultry feeder of claim 6, wherein the first wall and the second wall are rotatable with respect to each other about a pivot.

8. The poultry feeder of claim 4, wherein the lead member extends less than the full length of the first wall.

9. A poultry feeder comprising: a first tray member having a first base; and a second tray member having a second base disposed along an arc of a cylinder, and a lip extending from the second base in a direction not along an arc of the cylinder, the first tray member and the second tray member adjacent one another and movable with respect to one another together through a range of motion during which a portion of the second tray member is above a portion of the first tray member, the lip of the second tray member engaging the first base of the first tray member through the range of motion; wherein the second base has an inner end portion from which the lip extends, wherein the lip extends downwardly between about 25° and about 35° with respect to the inner end portion.

10. The poultry feeder of claim 9, further comprising a lead member extending from the first base, at least a portion of the lead member having a lead member thickness which is less than that of the thickness of the first base.

11. A poultry feeder comprising: a first tray member having a first base with an upper surface; and a second tray member having a second base, the second tray member including a lip downwardly extending from the second base, the first tray member and the second tray member movable with respect to one another through a range of motion with the second base being above the first base through the range of motion, thereby together defining a size-adjustable tray, the lip of the second tray member engaging the upper surface of the first base of the first tray member continuously through the range of motion to assist in preventing feed from escaping the tray; wherein the second base has an inner end portion from which the lip extends, wherein the lip extends downwardly between about 25° and about 35° with respect to the inner end portion.

12. The poultry feeder of claim 11, wherein the first base of the first tray member has a curvature.

13. The poultry feeder of claim 12, wherein the second base of the second tray member has a curvature.

14. The poultry feeder of claim 11, wherein the first tray member and the second tray member are rotatably movable with respect to each other about a pivot.

15. The poultry feeder of claim 11, wherein the first base has an inner edge and a lead member extending downwardly from the first base.

16. The poultry feeder of claim 11, the first tray member further including a first wall connected to the first base.

17. The poultry feeder of claim 16, the second tray member further including a second wall connected to the second base.

18. The poultry feeder of claim 15, wherein the lead member at least partially has a smaller thickness than the thickness of the first base.

* * * * *

UNITED STATES PATENT AND TRADEMARK OFFICE
CERTIFICATE OF CORRECTION

Page 1 of 1

PATENT NO. : 11,076,580 B2
APPLICATION NO. : 16/124683
DATED : August 3, 2021
INVENTOR(S) : Philippe Plouzen It is certified that error appears in the above-identified patent and that said Letters Patent is hereby corrected as shown below:

On the Title Page

Item (73):
Change "Middlelbury, IN (US)" to ---Middlebury, IN (US)---

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*